Sept. 13, 1955
H. D. ISENBERG
2,717,917
HIGH VOLTAGE INSULATED CONDUCTOR AND
METHOD OF MANUFACTURING THE SAME
Filed Dec. 10, 1949
2 Sheets-Sheet 1
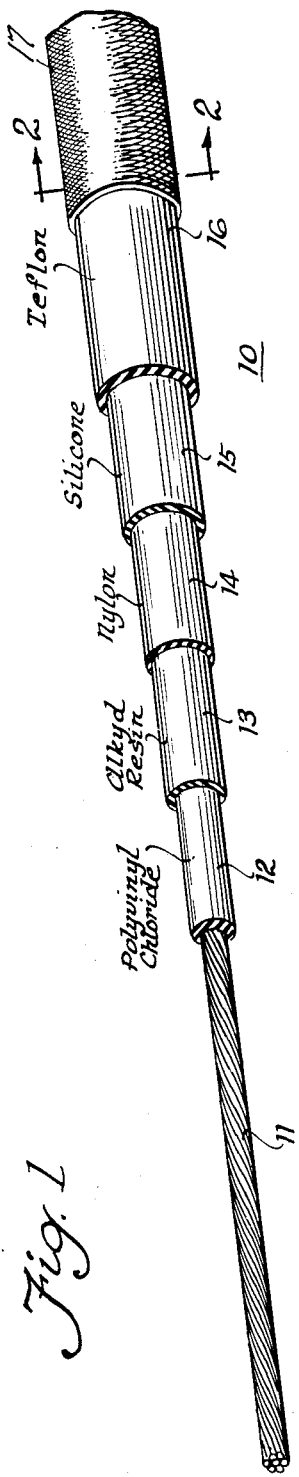
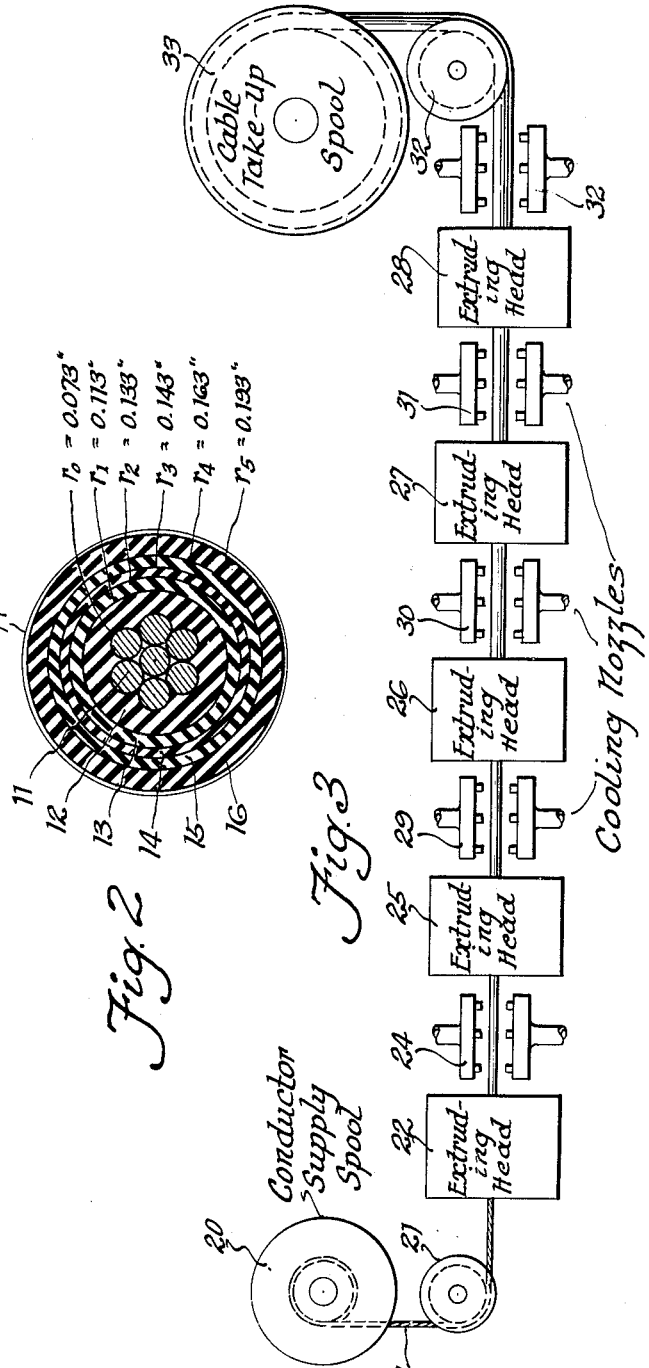
INVENTOR.
Hans D. Isenberg
BY
Mason, Kolehmainen, Rathburn & Wyss
Att'ys Sept. 13, 1955

H. D. ISENBERG 2,717,917

HIGH VOLTAGE INSULATED CONDUCTOR AND
METHOD OF MANUFACTURING THE SAME

Filed Dec. 10, 1949

VOLTS/MIL THICKNESS --- DIELECTRIC STRENGTH OF SHEET INSULATION

TOPOGRAPHIC DIAGRAM OF
VOLTAGE STRESSES ACROSS
VARIOUS INSULATIONS
OF CABLE

INVENTOR.
Hans D. Isenberg
BY
Mason, Kolehmainen, Rathburn & Wyss
Attys

United States Patent Office 2,717,917
Patented Sept. 13, 1955

2,717,917

HIGH VOLTAGE INSULATED CONDUCTOR AND METHOD OF MANUFACTURING THE SAME

Hans D. Isenberg, Wilmette, Ill.

Application December 10, 1949, Serial No. 132,368

4 Claims. (Cl. 174—25)

The present invention relates to high voltage insulated conductors and more specifically to an improved insulated high tension cable and the method of manufacturing such a cable.

An ideal high tension cable, from the standpoint of voltage stress distribution, and consequently from the standpoint of safe operation, is one having a straight line voltage stress relationship throughout the conductor insulation from conductor surface to cable surface. Present day high tension cables generally comprise only one type of insulation such as solid rubber, layers of varnished cambric tape, layers of oil impregnated paper tape, and the like. The voltage stress at any point in the cable insulation may be calculated by the following formula:

$$S = \frac{E}{2.303 y \log_{10} \frac{D}{d}} \quad (1)$$

where $S$ is the stress in volts per mil at any point in the insulation $y$ mils from the axis, $E$ is the voltage across the insulation in volts, $d$ is the minimum diameter of the insulation immediately surrounding the conductor, $D$ is the outside diameter of the insulation surrounding the conductor, and $y$ is the distance from the axis of the conductor to the point at which the stress is being measured in mils. From an examination of the equation, it will be apparent that the defined relationship may be graphically plotted as hyperbola. Moreover, the maximum stress occurs in the first few mils of thickness of the insulation immediately surrounding the current path and the stress gradually decreases as the thickness of the insulation increases. Consequently, dielectrics suitable for cable insulation possess high dielectric breakdown characteristics when used in thin sections and low breakdown characteristics, relatively speaking, when used in thick sections. It will thus be apparent that to obtain a cable characterized by a high insulation utilization factor, thin sections of insulation should be used. It is for this reason that tapered insulations are sometimes employed in cable structures. However, the danger of voids or air pockets between the layers of tapered insulation is always present and the elimination of such air pockets and voids requires special and costly treatment of the finished cable structure.

It is an object of the present invention, therefore, to provide a cable and method of making the same having a maximum insulation utilization factor and wherein voids or air pockets in the cable structure are completely eliminated.

In many applications it is essential that the insulated cable have great flexibility which requires that the cable diameter and hence the thickness of the insulating wall be held to a minimum. Moreover, it is always desirable to use a minimum of insulating material in the interests of minimizing the cost and weight of the finished cable. For these reasons insulations having high dielectric constants are indicated as desirable. It has been discovered, however, that when insulating materials having high dielectric constants are used in air, which has a dielectric constant of 1, or in insulating oils such as transformer insulating oils, which have dielectric constants of the order of 2 to 2.5, they exhibit discontinuous sparking over the insulation surfaces known as corona discharges. Corona is undesirable since it causes local heating and accelerated destruction of the insulation. It also results in the production of ozone which is a powerful oxidizing agent capable of destroying the insulating properties of many insulating materials. It has also been discovered that the greater the difference between the dielectric constant of the outer cable insulation and the dielectric constant of the medium in which the cable is used, the more corona is evidenced.

In many applications, cables are subjected to a plurality of different mediums at the same time. For example, in many oil immersed transformers high tension terminal cables are employed which are partly immersed in oil and partly surrounded by air. Transformer oils have an average dielectric constant of 2.2 while air has a dielectric constant of 1. In the particular application mentioned, the high tension cable lead may be partially immersed in the transformer insulating oil with the remainder disposed in the air or other medium above the level of the transformer oil. These cables are generally connected to the transformer winding prior to a drying out process which the transformer winding assembly is subjected to. In many cases this drying out process is made at a temperature ranging between 105 and 110° C. for a period of the order of 72 hours or more depending upon the transformer size. Subsequently, the transformer winding assembly is placed within the oil filled housing and the winding taps are connected to the high voltage bushing terminals by the insulated high tension cables. During this operation the cables must be bent into place which sometimes requires several right angle bends. If a taped insulation is employed, such as varnished cambric, it becomes very hard and brittle during this drying out process and the necessary bending operations often cause insulation cracks requiring replacement thereof. It is desirable, therefore, to employ a high tension cable in an application of the character mentioned which can be subjected to many hours of high temperature, as during the drying out process of a transformer winding assembly, while still having excellent bending properties which will permit sharp bends therein without in any way affecting the insulation.

Accordingly, it is an object of the present invention to provide an improved high tension insulated cable comprising a plurality of layers of a thermoplastic insulation, which layers are so arranged that the cable has a considerably smaller over-all diameter for the same insulation value, and has superior bending and heat resisting properties as compared with prior art arrangements.

It is another object of the present invention to provide a high tension cable which will provide substantially a straight line voltage stress-thickness characteristic throughout the insulation.

It is a further object of the present invention to provide a high voltage cable which is smaller and more flexible than conventional type cables, which may be produced at a substantially lower cost, is corona free, and has a substantially longer life than insulations presently employed.

It is another object of the present invention to provide a laminated cable insulation in which air pockets or voids between layers are eliminated and which has a very high insulation utilization factor.

A still further object of the present invention resides in an improved method of manufacturing an insulated cable resulting in about a 33⅓ per cent reduction in cost with a total thickness for the same insulation level much reduced from cable insulations employed heretofore.

Still another object of the present invention resides in the provision of a high voltage cable insulated with a plurality of layers of different insulating materials which has an over-all diameter smaller than that of insulated cables of the same rating employed heretofore, possesses a much higher flexibility and is substantially corona free.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 1 is a perspective view of a high tension cable embodying the present invention with portions thereof cut away for the purpose of better disclosing the construction;

Fig. 2 is a sectional view taken on the line 2—2 of Fig. 1;

Fig. 3 is a schematic diagram illustrating a method of manufacturing the cable shown in Figs. 1 and 2 of the drawings;

Figure 4:
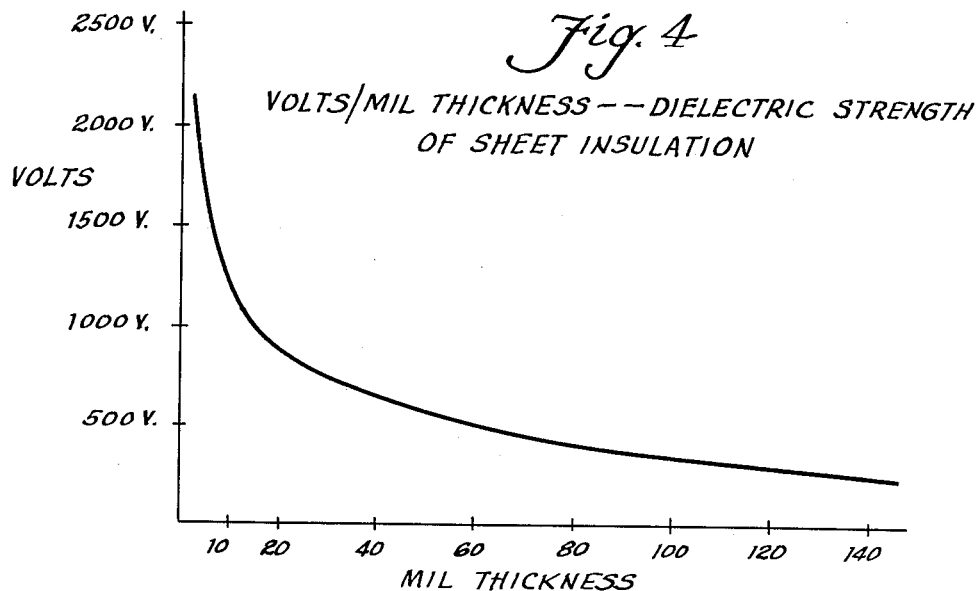
Figs. 4 and 5 are graphs included herein to facilitate explanation of the present invention.

In accordance with the present invention there is provided a high tension insulated electrical cable comprising a conductor surrounded by a plurality of layers of preferably extrudable thermoplastic insulating materials, each layer formed of insulation having a different dielectric constant. Preferably the dielectric constants of the successive layers of insulation decreases from the innermost layer, which has the highest dielectric constant, to the outermost layer, which has the lowest dielectric constant. Also in accordance with the present invention, at least one of the layers of the multi-layer or laminated insulation has a dielectric constant substantially equal to the dielectric constant of the medium in which the cable is to be used whether the medium be air, oil, or the like. Furthermore, if the cable is to be used with portions thereof in different mediums, then preferably there will be provided a plurality of insulating layers, one having a dielectric constant substantially equal to that of one medium and a second having a dielectric constant substantially equal to that of the other medium. The cable is preferably manufactured in a continuous process with the insulating layers formed of plastic materials which are substantially unaffected by ozone resulting from corona and which are extruded onto the cable in a manner to preserve the identity of the different layers while still eliminating the possibility of any voids, air pockets or the like.

Referring now to the drawings and more particularly to Figs. 1 and 2 thereof, there is illustrated a high tension cable generally designated at 10 which includes an inner conductor portion 11 illustrated as in the form of a stranded cable although it will be understood that the conductor section 11 may comprise a solid conductor. When used, for example, as a transformer lead requiring great flexibility, a stranded conductor section 11, as illustrated, is preferable. In accordance with the present invention, the cable 10 comprises an insulating covering or coating of laminated construction and essentially includes a plurality of layers of plastic insulation specifically designated by the reference numerals 12, 13, 14, 15 and 16. Each of the individual insulating layers, which comprise relatively thin sections in order to obtain a high insulation utilization factor, is preferably formed of an extrudable plastic insulation from one of the readily available plastic materials now on the market, although it should be understood that one or more of the insulating layers might comprise a nonplastic insulation such as cotton braid or the like. In Fig. 1 of the drawings, the various layers of the multi-layer plastic insulation are designated as each comprising a different specific material. Such a cable embodying these materials has been successfully constructed and tested and found to be very satisfactory. It should be understood, however, that the particular plastic insulations designated are by way of example only and not by way of limitation.

Some of the materials available on the market today, which are admirably suited for high tension cables embodying the present invention, are set forth in the following table which also includes their respective dielectric constants as well as their rated breakdown voltage per unit of thickness. These insulations are merely representative and are not all inclusive.

*Table I*

| Material | Dielectric Constant $\epsilon$ | Breakdown Voltage in Volts per mil |
|---|---|---|
| Polyvinyl chloride Resin | 7.0 to 10.5 | 1,000. |
| Alkyd Resin | 6.2 | 800. |
| Cellulose Acetate | 5 to 6 | 1,000 to 2,000. |
| Nylon (polymeric Amide) | 4.6 | 1,000. |
| Formal Acetate | 3.6 | 1,000. |
| Silicones | 3.1 to 3.8 | 500 to 1,000. |
| Trifluorochloroethylene | 2.5 to 3.0 | 1,000. |
| Polystyrene | 2.5 | 1,000 to 2,000. |
| Polyethylene | 2.14 | 1,000 to 1,500. |
| Tetrafluoroethylene | 2.0 | 1,000. |
| Cotton braid, wax or Compound impregnated. | 1.2 to 1.5 | 200 to 300. |

Among the dielectrics listed above, the alkyd resins, trifluoroethylene and the silicones in addition to having high dielectric properties, possess a very high resistance to electric arcs. The reason for this is that an arc struck over or through these insulation materials does not produce decomposition products containing carbon and therefore will not provide a conducting path for subsequent arcs. Moreover, most of the insulations set forth in Table I are substantially unaffected by ozone which is formed as a result of corona and also are not deleteriously affected by ultra-violet light which is associated with such arcs as mentioned above.

In order better to understand the reasons for employing a plurality of thin sections of insulation in accordance with the present invention, reference may be had to Fig. 4 of the drawings where a conventional stress curve for a sheet of homogeneous insulation is plotted, the abscissae of this curve representing the thickness in mils of the homogeneous insulation, while the ordinates represent the voltage applied across this insulation. This curve indicates clearly that the voltage per mil to which the insulation may be subjected is very high for thin layers of insulation since the stress curve is effectively a hyperbola. However, as the insulation thickness increases, the volts per mil rapidly decrease so that the utilization factor of very thick insulation is quite low. Thus the curve shown in Fig. 4 indicates that a high insulation utilization factor is obtained with thin layers of insulation and it is for this reason that the cable 10 is shown in Fig. 1 as an insulated cable having a plurality of relatively thin layers of extruded insulation. From the standpoint of obtaining maximum insulation with minimum wall thickness, it would be desirable if the curve of Fig. 4 of the drawings were a straight line parallel with the horizontal axis, thus indicating a uniformly high insulation utilization factor throughout the insulating wall. The cable of the present invention tends to approach the ideal in this respect. The curve of Fig. 4 also shows that since the maximum stress occurs at the surface of the conductor, the innermost layer of insulation should have a very high dielectric constant and the layers successively surrounding the inner layer may have dielectric constants of decreasing values, such that the dielectric strength of each insulating layer is somewhat proportional to the voltage gradient which would be present at that distance from the conductor surface if the conductor were surrounded by a homogeneous insulating material of the thickness required to provide the necessary dielectric strength.

An important feature of the present invention resides in choosing the dielectric constant of at least one of the layers of the multi-layer plastic insulation so as to have a value approximately equal to that of the medium in which the cable is to be used. Actual tests have conclusively demonstrated that corona discharges are greatly reduced when this feature is employed. Preferably the outer layer of insulation is the one chosen to have a dielectric constant approximating that of the medium in which the cable is employed. It is not known exactly why a marked decrease in corona effects, clearly demonstrated by extensive tests, is obtained when this feature of the present invention is employed and no theories regarding this feature are advanced herein.

The specific structure of the cable 10 shown in Figs. 1 and 2 contemplates use in transformer oil having a dielectric constant of $\epsilon = 2.2$ with an operating voltage of 30 kv. For this specific application insulated cable is illustrated as comprising No. 8 seven strand conductor with an overall diameter of 0.386 inch. Table II below sets forth the insulation characteristics for one specific construction for this purpose.

*Table II*

| Layer No. | Material | Dielectric Constant | Wall Thickness, inches | Dielectric Strength in Volts per Mil | Capacitance |
|---|---|---|---|---|---|
| 1 | Polyvinyl Chloride | 8.3 | .040 | 1,000 | .883 |
| 2 | Alkyd Resin | 6.2 | .020 | 800 | .957 |
| 3 | Nylon | 4.6 | .010 | 1,000 | .772 |
| 4 | Silicone | 3.4 | .020 | 800 | .545 |
| 5 | Teflon | 2.14 | .030 | 750 | .328 |

Figure 5:
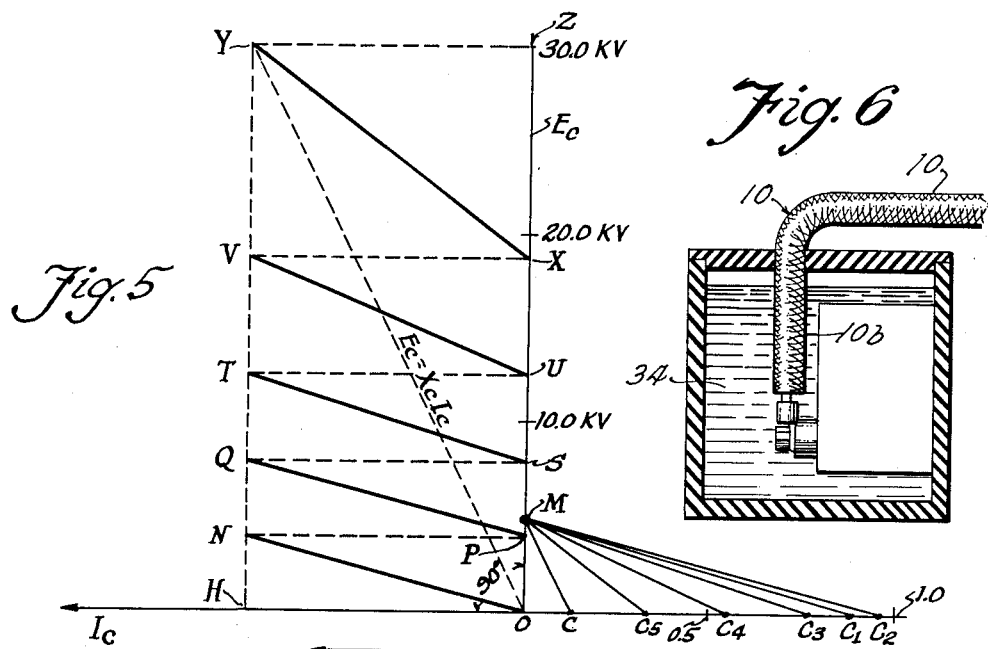

A diagrammatic representation of the voltage stresses for the particular structure set forth in Table II and disclosed in Figs. 1 and 2 of the drawings is included in Fig. 5 of the drawings. As there shown, the vector $E_c$ represents the applied voltage of 30 kv. across the insulation. This insulation effectively acts as the dielectric of a capacitor in that the applied voltages cause a current to flow through the insulation which leads the applied voltage by 90° and which is represented by the vector $I_c$. This current can be measured by a suitable meter when the 30 kv. voltage is applied across the multi-layer insulation of a predetermined length of cable insulated according to Table II above. From the fundamental impedance equation $$E_c = C_c I_c \qquad (2)$$

the capacitive reactance $X_c$ can readily be calculated in ohms of impedance to the current $I_c$, and since $$X_c = \frac{1}{2\pi f C} \qquad (3)$$

the total or overall capacitance C of the multi-layer insulation may readily be determined. Referring to Fig. 5 of the drawings, the magnitude of the capacitance C is plotted as the distance OC on the abscissa to the right of vector $E_c$. A reference point M is chosen on the vector $E_c$ at a random distance from O and connected with C. The line OY is then drawn parallel to CM, intersecting the parallel HY to the voltage vector $E_c$. A line through point Y parallel to the current vector $I_c$ intersects voltage vector $E_c$ at point Z. The distance OZ then represents the voltage applied across the cable assembly.

The effective capacitances $C_1$, $C_2$, $C_3$, $C_4$, and $C_5$ for the insulating layers 1 to 5 set forth in Table II can readily be calculated from the well known cable formula $$C_n = \frac{K \epsilon l}{\log_{10} \frac{D}{d}} \qquad (4)$$

where $C_n$ is the capacitance of a particular layer $n$, $\epsilon$ is the dielectric constant, $l$ is the length of the cable in feet equal to the predetermined length used when measuring $I_c$ referred to above, D is the outer diameter of the insulation layer, $d$ is the inner diameter of the insulation layer and K is a constant. These calculated capacitances $C_1$, $C_2$, $C_3$, $C_4$ and $C_5$ (set forth in Table II) are plotted on the same scale as C in Fig. 5 of the drawings, and the lines $MC_1$, $MC_2$, $MC_3$, $MC_4$ and $MC_5$ drawn comparable to the curve MC. Since the capacitive current $I_c$, which flows through the laminated insulation, must also flow through each of the layers of insulation separately, the lines ON, PQ, ST, UV, and XY of Fig. 5 may be drawn each parallel to its corresponding line $MC_1$, $MC_2$, $MC_3$, $MC_4$ and $MC_5$, respectively, with the line ON starting at $E_c = 0$ and successive lines starting at the voltage level at which the preceding one terminated. The voltage difference between successive lines along the ordinate scale with zero abscissa represents the voltage across a particular layer of insulation. In other words OP is the voltage across the layer 1, PS the voltage across the layer 2, SU the voltage across the layer 3, UX the voltage across the layer 4, and XZ the voltage across the layer 5; the total of these voltages comprising the total voltage across the multi-layer insulation. From Fig. 5 of the drawings the voltage across each layer can readily be determined as follows:

*Table III*

| Layer No. | Fig. 5 Representation | Voltage Across Each Layer When Total Voltage is 30 kv. |
|---|---|---|
| | | Kv. |
| 1 | OP | 4.0 |
| 2 | PS | 3.8 |
| 3 | SU | 4.8 |
| 4 | UX | 6.2 |
| 5 | XZ | 11.2 |
| Total | | 30.0 |

For the thickness of each of the respective layers of insulation and the dielectric strength in volts per mil from Table II the breakdown voltage in volts per mil for each layer of insulation may be computed. These computed breakdown voltages and the wall thickness determined from the radii indicated by Fig. 2 are as follows:

*Table IV*

| Layer No. | Material | Dielectric Strength in Volts/mil | Wall Thickness, inches | Breakdown Voltage, kv. |
|---|---|---|---|---|
| 1 | Polyvinyl Chloride | 1,000 | .040 | 40 |
| 2 | Alkyd Resin | 800 | .020 | 16 |
| 3 | Nylon | 1,000 | .010 | 10 |
| 4 | Silicone | 800 | .020 | 16 |
| 5 | Teflon | 750 | .030 | 22.5 |
| Total computed Breakdown Voltage. | | | | 104.5 |

The actual breakdown voltage for the specific cable referred to above under oil was found by numerous tests to average 105 kv. which is remarkably close to the computed value.

From an examination of Fig. 5 and Table III, it will be noted that the voltage appearing across each layer of insulation is dependent upon the dielectric constant and also the thickness of the insulation. The higher the dielectric constant, the lower the voltage gradient appearing across the particular layer. If an insulating layer having a very low dielectric constant were employed, a very substantial proportion of the total voltage would appear thereacross with possible breakdown of the layer and, in the event of voids in such insulation, corona and accelerated destruction of this layer would result. As a consequence, the voltage which should appear across the particular layer is transferred to adjacent layers in addition to the voltage already present on the adjacent layers.

Figure 6:
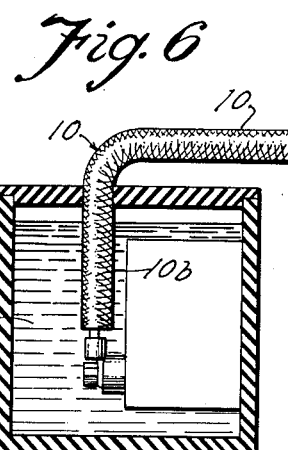
Fig. 6 diagrammatically illustrates the use of the cable shown in Fig. 1 in supplying current to an oil filled transformer casing wherein the cable is exposed both to the transformer oil and to air.

In the event that the specific cable structure shown in Figs. 1 and 2 is to be used in air rather than oil, the outer layer of insulation 16 would preferably comprise an insulation having a dielectric constant approaching 1. Such an insulation could be cotton braid, with or without impregnation with a suitable wax, paraffin or tar compound. In the event the cable 10 is to be used partially in air and partially in transformer oil, as illustrated in Fig. 6, the outer Teflon layer 16 is preferably covered with unimpregnated cotton braid 17 which is capable of absorbing the transformer oil, so that that portion 10a of the cable which is in air has a dielectric constant approximating that of air, i. e., 1, and that portion 10b of the cable which is immersed in oil 34 has an outer insulating covering, i. e., the oil soaked cotton braid 17 and the Teflon layer 16, having a dielectric constant approximating that of transformer oil. Preferably, the present improved cable is comprised of plastic materials for each of the several layers which is not adhered to the adjacent layers.

Referring to Fig. 3 of the drawings, the apparatus there schematically illustrated is well adapted for use in making the cable shown in Fig. 1. As there shown, the stranded conductor 11 is supplied from a conductor supply spool 20 over a guide roller 21 to an extruding die contained in the extruding head 22 whereby the inner insulating layer 12 is applied thereto. Following this, the cable passes through cooling apparatus specifically illustrated as air nozzles 24. The succeeding insulating layers 13, 14, 15 and 16 are applied by extruding heads 25, 26, 27 and 28 respectively. Suitable cooling means such as the air nozzles 29, 30, 31 and 32 may be provided at the outlet side of each head for cooling the thermosetting or thermoplastic material to cause rapid hardening and curing thereof. The completed insulated cable then passes around a guide roller 32 and is wound upon a take-up spool 33. In the event that the last insulating layer should comprise a cotton braid or the like, the extruding head 28 may be replaced by a suitable machine for applying the braid, followed by a suitable device for impregnating the braid with a coating of wax, paraffin or the like.

From the above explanation it will be understood that the particular plastic materials which may be employed in making the cable are many and that they can be arranged in various manners. However, in accordance with the present invention they are preferably arranged in thin layers in the order of decreasing magnitude of the dielectric constants thereof from the innermost to the outermost layer and at least one layer, preferably the outer layer, is made from a material having a dielectric constant approximating that of the medium in which the cable is to be used. Extensive tests have proven that high tension cables, manufactured in accordance with the present invention, provide substantially straight line voltage stress characteristic throughout the insulation. Furthermore, the overall insulation for the same voltage rating may be greatly decreased with a resultant reduction in cost and greater flexibility of the cable structure. Moreover, the cable is substantially corona free and by employing one or more layers of arc resistant insulation, the cable is provided with a much longer life than insulated cables heretofore employed.

While a particular embodiment of the present invention has been illustrated and described it will be understood that various changes and modifications may be made therein without departing from the invention, and it is, therefore, aimed in the appended claims to cover all such changes and modifications as fall within the true spirit and scope of this invention.

What is claimed as new and desired to be secured by Letters Patent of the United States is:

1. In combination, at least two different mediums having different dielectric constants, and an insulated conductor exposed to said mediums, said insulated conductor comprising an electrical conductor surrounded by a plurality of insulating layers, the next to outermost insulating layer having a dielectric constant approximately equal to that of a first of said mediums, the outermost of said insulating layers immediately surrounding said next to outermost layer and having a dielectric constant substantially equal to that of the second of said mediums to which said conductor is exposed, said outermost layer being pervious to the first medium so that it assumes a dielectric constant approximating that of said first medium when exposed thereto whereby in use said outermost layer has different dielectric constants approximating those of the different mediums.

2. In combination, a liquid medium and a gaseous medium having different dielectric constants, and an insulated conductor exposed to said mediums, said insulating conductor comprising an electrical conductor surrounded by a plurality of insulating layers, the next to outermost of said layers having a dielectric constant approximating that of the liquid medium, the outermost of said insulating layers immediately surrounding said next to outermost layer and having a dielectric constant substantially equal to said gaseous medium, said outermost layer being comprised of fabric material so as to absorb said liquid medium in order to attain a dielectric constant approximately equal thereto whereby said outermost layer has different dielectric constants corresponding to those of the mediums to which it is exposed.

3. In combination, a liquid medium and a gaseous medium having different dielectric constants, and an insulated conductor exposed to said mediums, said insulating conductor comprising an electrical conductor surrounded by a plurality of insulating layers, the next to outermost insulating layer having a dielectric constant approximately equal to that of said liquid medium, the outermost of said insulating layers immediately surrounding said next to outermost layer and having a dielectric constant substantially equal to that of the gaseous medium which outermost layer is pervious to the first medium in order to assume different dielectric constants approximating those of the different mediums to which it is exposed.

4. In combination, a plurality of different mediums each having a different dielectric constant, and an insulated conductor extending through said mediums, said insulated conductor comprising a conductor, a plurality of insulating layers surrounding said conductor, the next to outermost insulating layer having a dielectric constant approximating that one of said mediums, the outermost of said insulating layers comprising fabric material, being positioned immediately surrounding said next to outermost layer and having a dielectric constant approximating that of a second of said plurality of mediums, said outermost fabric layer being pervious to the first medium in order to assume the dielectric constant thereof whereby the dielectric constants of the insulated conductor are approximately matched to the dielectric constants of the medium to which the insulated conductor is exposed.

References Cited in the file of this patent

UNITED STATES PATENTS

| | | |
|---|---|---|
| 2,123,746 | Rost | July 12, 1938 |
| 2,298,324 | Williams | Oct. 13, 1942 |
| 2,454,625 | Bondon | Nov. 23, 1948 |
| 2,523,082 | Wilson | Sept. 19, 1950 |

FOREIGN PATENTS

| | | |
|---|---|---|
| 155,098 | Germany | Oct. 15, 1904 |
| 231,227 | Germany | Feb. 18, 1911 |
| 118,280 | Australia | Mar. 30, 1944 |